(12) United States Patent
Fischer et al.

(10) Patent No.: US 8,678,431 B2
(45) Date of Patent: Mar. 25, 2014

(54) AIR BAG WITH TETHER AND PULLEY ARRANGEMENT

(75) Inventors: Kurt F. Fischer, Leonard, MI (US); Douglas M. Gould, Lake Orion, MI (US)

(73) Assignee: TRW Vehicle Safety Systems, Washington, MI (US)

( * ) Notice: Subject to any disclaimer, the term of this patent is extended or adjusted under 35 U.S.C. 154(b) by 24 days.

(21) Appl. No.: 13/114,349

(22) Filed: May 24, 2011

(65) Prior Publication Data

US 2012/0104737 A1 May 3, 2012

Related U.S. Application Data

(63) Continuation-in-part of application No. 12/912,800, filed on Oct. 27, 2010.

(51) Int. Cl.
*B60R 21/2338* (2011.01)

(52) U.S. Cl.
USPC ........................ 280/743.2; 280/739

(58) Field of Classification Search
USPC .............................. 280/739, 743.2
See application file for complete search history.

(56) References Cited

U.S. PATENT DOCUMENTS

| | | | |
|---|---|---|---|
| 5,246,250 A * | 9/1993 | Wolanin et al. ............... 280/739 |
| 6,095,557 A * | 8/2000 | Takimoto et al. ............. 280/739 |
| 6,254,130 B1 * | 7/2001 | Jayaraman et al. ........ 280/743.2 |
| 6,554,316 B2 | 4/2003 | Schneider et al. |
| 6,736,426 B2 * | 5/2004 | Winters et al. ............. 280/743.2 |
| 6,869,103 B2 * | 3/2005 | Ryan et al. .................. 280/743.2 |
| 6,932,385 B2 * | 8/2005 | Hawthorn et al. ............ 280/739 |
| 6,981,719 B2 * | 1/2006 | Igawa ........................ 280/743.2 |
| 7,131,664 B1 | 11/2006 | Pang et al. |
| 7,134,691 B2 | 11/2006 | Dunkle et al. |
| 7,152,880 B1 | 12/2006 | Pang et al. |
| 7,377,548 B2 * | 5/2008 | Bauer et al. ................ 280/743.2 |
| 7,396,045 B2 * | 7/2008 | Aranzulla et al. .......... 280/743.2 |
| 7,445,237 B2 * | 11/2008 | Boyle et al. ................... 280/739 |
| 7,597,355 B2 * | 10/2009 | Williams et al. .............. 280/739 |
| 7,597,356 B2 * | 10/2009 | Williams ...................... 280/739 |
| 7,614,653 B2 * | 11/2009 | Rose et al. .................... 280/739 |
| 7,625,008 B2 | 12/2009 | Pang et al. |
| 7,726,685 B2 * | 6/2010 | Abe et al. ...................... 280/736 |
| 7,748,738 B2 * | 7/2010 | Schneider .................... 280/740 |
| 7,784,828 B2 * | 8/2010 | Matsu et al. .................. 280/739 |

(Continued)

FOREIGN PATENT DOCUMENTS

| | | |
|---|---|---|
| DE | 202006002496 | 8/2006 |
| DE | 60301361 | 9/2006 |
| DE | 102007000116 | 10/2007 |
| JP | 2001-301555 | 10/2001 |

*Primary Examiner* — Nicole Verley
(74) *Attorney, Agent, or Firm* — Tarolli, Sundheim, Covell & Tummino LLP

(57) ABSTRACT

An apparatus (10) for helping to control deployment of an inflatable protection device (14) includes a tether (150) having a first connection with a first portion (100, 104) of the protection device and a second connection with a second portion (102) of the protection device. A guide (156) is connected to the protection device (14). The tether (150) extends through the guide (156). The tether (150) is configured to move through the guide (156) in order to translate movement of the first portion (100, 104) of the protection device (14) in a first direction to movement of the second portion (102) of the protection device in a second direction different from the first direction.

23 Claims, 5 Drawing Sheets

(56) References Cited

U.S. PATENT DOCUMENTS

| | | | |
|---|---|---|---|
| 7,789,421 B2 * | 9/2010 | Issler et al. | 280/743.2 |
| 7,837,228 B2 * | 11/2010 | Abe | 280/743.1 |
| 7,857,346 B2 * | 12/2010 | Reiter et al. | 280/743.2 |
| 7,878,538 B2 * | 2/2011 | Abe et al. | 280/739 |
| 7,883,110 B2 * | 2/2011 | Pausch | 280/739 |
| 7,922,197 B2 * | 4/2011 | Fukawatase et al. | 280/739 |
| 7,922,200 B2 * | 4/2011 | Webber | 280/743.2 |
| 7,931,297 B2 * | 4/2011 | Abe et al. | 280/739 |
| 7,942,443 B2 * | 5/2011 | Dennis et al. | 280/743.2 |
| 7,954,850 B2 * | 6/2011 | Fischer et al. | 280/743.1 |
| 7,959,184 B2 * | 6/2011 | Fukawatase et al. | 280/739 |
| 8,020,891 B2 * | 9/2011 | Fukawatase et al. | 280/739 |
| 8,226,118 B2 * | 7/2012 | Rose et al. | 280/743.2 |
| 8,262,130 B2 * | 9/2012 | Fischer et al. | 280/743.2 |
| 2002/0175511 A1 | 11/2002 | Dunkle et al. | |
| 2003/0168842 A1 | 9/2003 | Igawa | |
| 2005/0001412 A1 * | 1/2005 | Schneider et al. | 280/730.1 |
| 2007/0045997 A1 * | 3/2007 | Abe et al. | 280/729 |
| 2007/0108753 A1 | 5/2007 | Pang et al. | |
| 2007/0145729 A1 * | 6/2007 | Ishiguro et al. | 280/739 |
| 2007/0205591 A1 * | 9/2007 | Bito | 280/743.2 |
| 2008/0073890 A1 * | 3/2008 | Williams et al. | 280/739 |
| 2009/0115176 A1 | 5/2009 | Reiter et al. | |
| 2009/0224519 A1 | 9/2009 | Fukawatase et al. | |
| 2010/0052297 A1 | 3/2010 | Fukawatase et al. | |
| 2010/0201107 A1 * | 8/2010 | Abe et al. | 280/730.1 |
| 2011/0198828 A1 * | 8/2011 | Fischer et al. | 280/743.2 |
| 2011/0260431 A1 * | 10/2011 | Kwon | 280/730.1 |

* cited by examiner

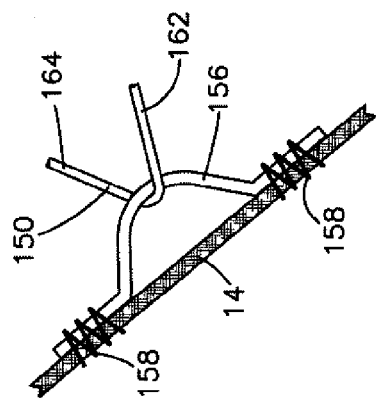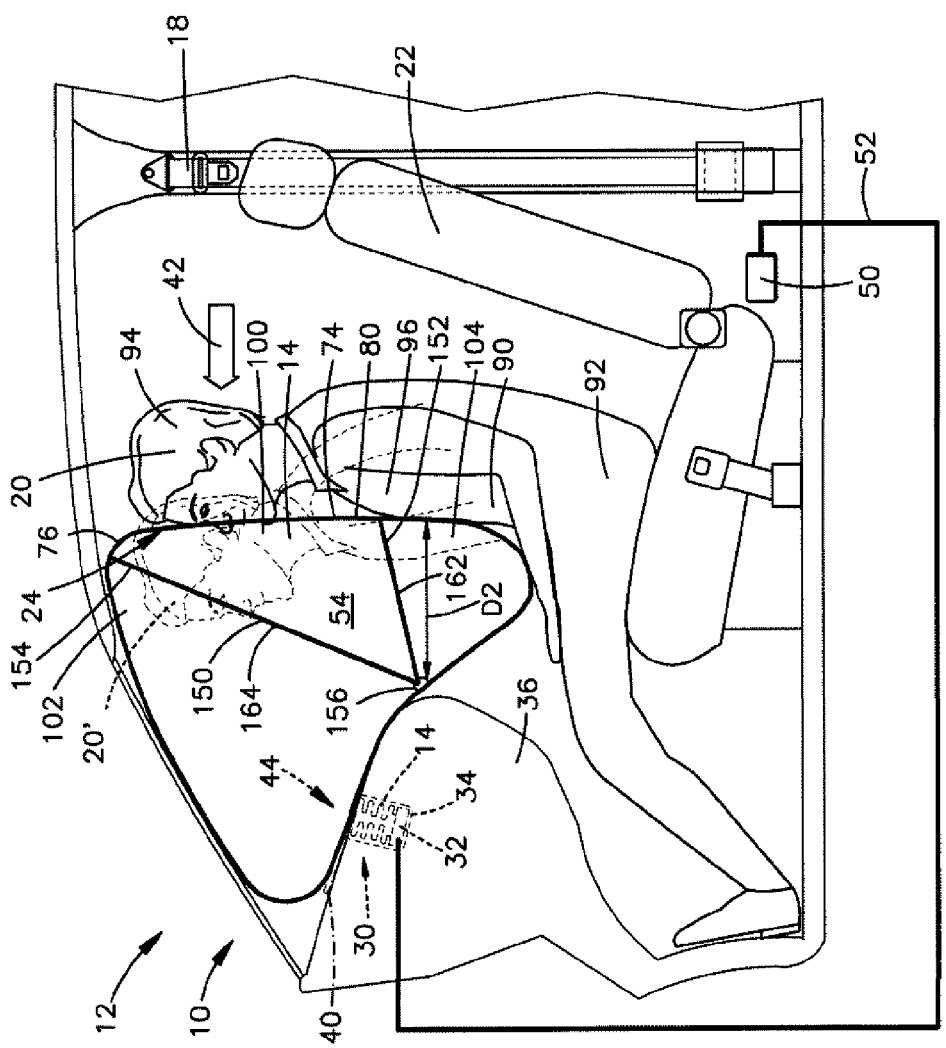

US 8,678,431 B2

AIR BAG WITH TETHER AND PULLEY ARRANGEMENT

RELATED APPLICATIONS

This application is a continuation in part of U.S. patent application Ser. No. 12/912,800, filed Oct. 27, 2010, which is hereby incorporated by reference.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated condition. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated condition. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

SUMMARY OF THE INVENTION

The present invention relates to an apparatus for helping to control deployment of an inflatable protection device. The apparatus includes a tether having a first connection with a first portion of the protection device and a second connection with a second portion of the protection device. A guide is connected to the protection device. The tether extends through the guide. The tether is configured to move through the guide in order to translate movement of the first portion of the protection device in a first direction to movement of the second portion of the protection device in a second direction different from the first direction.

The present invention also relates to an apparatus for helping to protect an occupant of a vehicle. The apparatus includes an inflatable vehicle occupant protection device inflatable between a vehicle surface and the vehicle occupant. The protection device includes first and second portions presented toward the occupant and a third portion positioned adjacent or near the vehicle surface. A tether has a first connection with the first portion of the protection device and a second connection with the second portion of the protection device. A guide is connected to the third portion of the protection device. The tether extends through the guide. The tether is configured to permit substantially full deployment of the first portion and to restrict deployment of the second portion when the protection device deploys without obstruction. The tether being configured to move through the guide in response to occupant penetration into the first portion to release the second portion for further deployment toward the fully deployed condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 1 and 2 are schematic side views illustrating different conditions of an apparatus for helping to protect an occupant of a vehicle, according to a first embodiment of the invention;

FIG. 3 is an enlarged view of a portion of the apparatus of FIGS. 1 and 2;

DETAILED DESCRIPTION OF THE INVENTION

Figure 1:
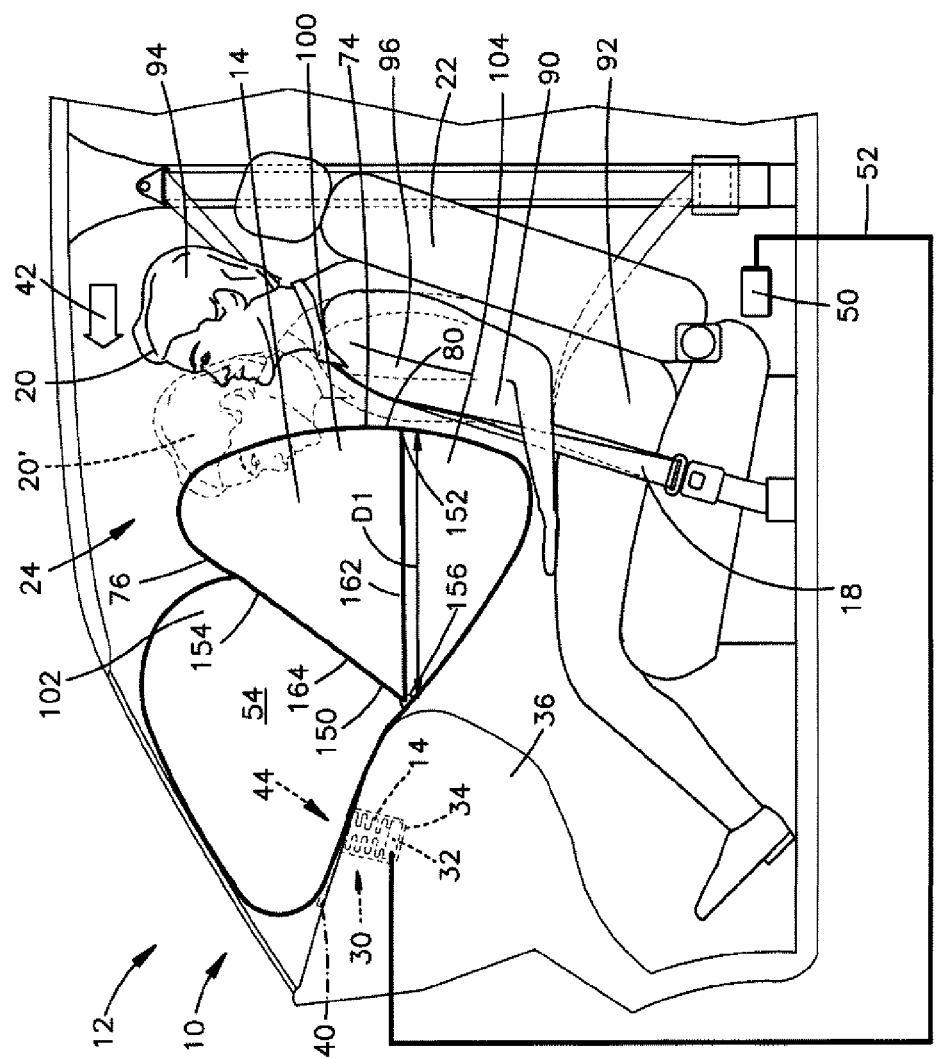

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12. As shown in FIGS. 1 and 2, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, while inflated, helps protect the vehicle occupant 20 from impacts with parts of the vehicle 12, such as the instrument panel 36.

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant is moved forward, as indicated by the arrow labeled 42 in FIGS. 1 and 2, into engagement with the air bag 14. The "penetration" of the occupant into the air bag 14 is the distance or degree to which the occupant 20 moves into the inflated depth of the air bag. In other words, the degree of penetration could be measured as the distance a given point on the front panel 74 is moved toward the instrument panel 36 by the penetrating occupant 20. For example, the degree of penetration can be calculated as the difference between the inflated depth labeled D1 in FIG. 1 and the penetrated depth labeled D2 in FIG. 2. Alternatively, penetration could be measured as the distance between a point on the front panel 74 and a fixed point on the instrument panel 36 or between a point on the occupant 20 (e.g., the occupant's chest) and a fixed point on the instrument panel.

Several factors determine the degree to which an occupant 14 penetrates the air bag 14. For example, the size or mass of the occupant 20, the speed at which the occupant strikes the air bag 14, the pressurization of the air bag, and whether or not the occupant is restrained by the seatbelt 18 all help determine the degree to which the occupant penetrates the air bag in a given deployment scenario. Some of these determining factors are illustrated in FIG. 4, which depicts chest to instrument panel air bag penetration for occupants that are different in size, that are belted versus unbelted, and that strike the air bag 14 at different speeds.

Figure 4:
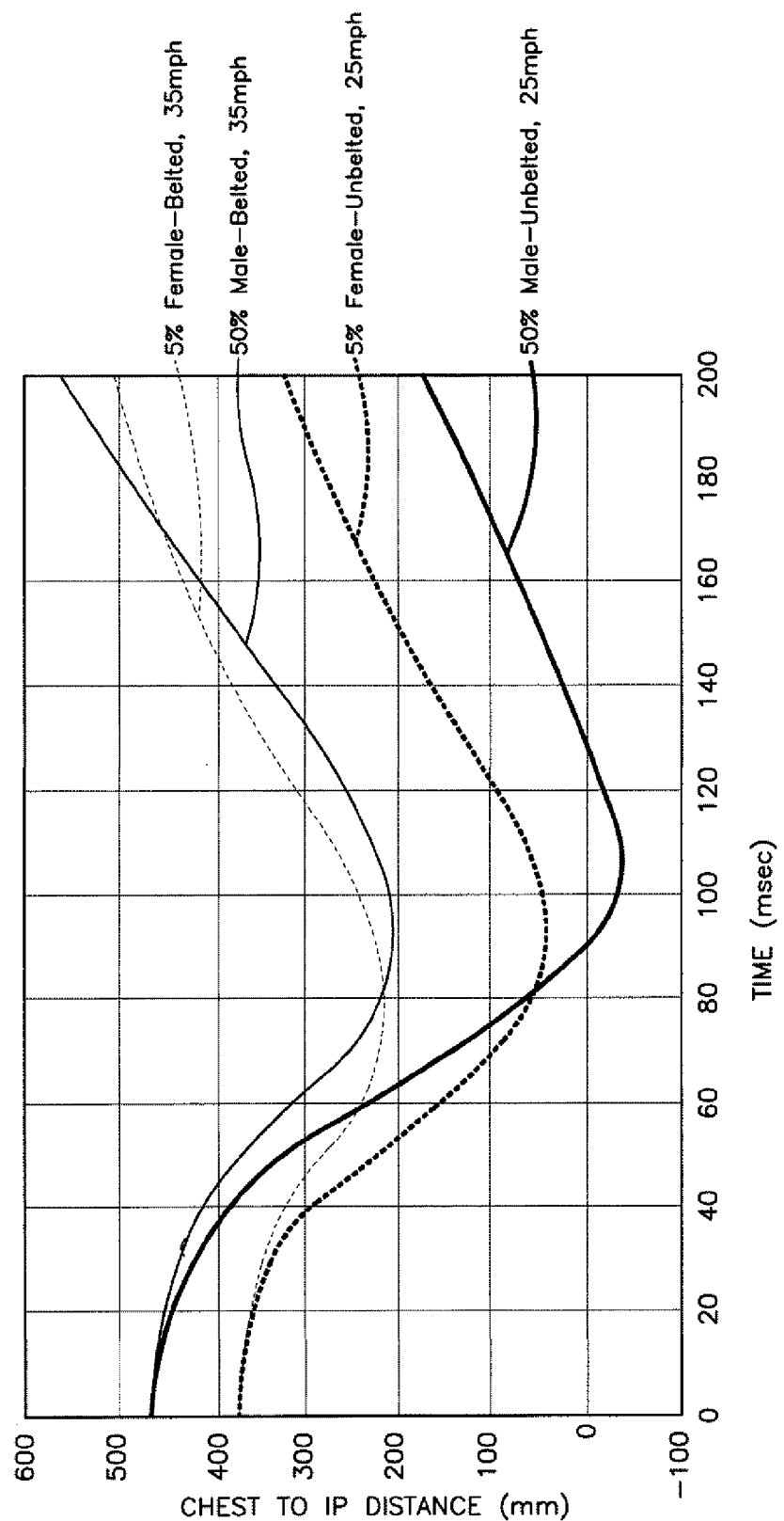
FIG. 4 is a chart illustrating certain occupant characteristics under different vehicle operating conditions.

FIG. 4 illustrates penetration values for two differently sized occupants—a $50^{th}$ percentile male occupant (50% male) and a $5^{th}$ percentile female occupant (5% female). The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 95% female. The 5% female is thus a small female occupant.

FIG. 4 illustrates that whether the occupant is belted versus unbelted has an effect on occupant penetration into the air bag. As shown in FIG. 4, an unbelted 5% female occupant travelling at 25 mph penetrates the air bag over approximately 150 mm more than a belted 5% female occupant traveling at 35 mph. Similarly, an unbelted 50% male occupant travelling at 25 mph penetrates the air bag well over 200 mm more (approximately 225 mm) than a belted 50% male occupant traveling at 35 mph. In fact, the unbelted 5% female traveling at 25 mph penetrates the air bag approximately 150 mm more than the belted 50% male occupant traveling at 35 mph.

The air bag 14 may have one or more actuatable features for helping to control or tailor inflation, deployment, and pressurization of the air bag in response to vehicle conditions, occupant conditions, or both vehicle and occupant conditions. According to the present invention, these features are actuatable passively in response to vehicle and occupant conditions at the time of inflation. Thus, in the illustrated embodiment, these features are actuatable without relying on active sensors and/or actuators, such as electrical or pyrotechnic actuators. Those skilled in the art will appreciate that certain ones of these features could be actuated actively, for example in response to conditions determined via active sensors.

Referring to FIGS. 1 and 2, the air bag 14 includes a tether 150 for adapting the configuration of the air bag 14 depending on vehicle or occupant conditions in the vehicle 12. In the embodiment of FIGS. 1 and 2, the adaptive tether 150 comprises a single length of tether material that has a first end portion 152 connected to the air bag 14, for example to a mid or lower portion 80 of a front panel 74 of the air bag. A second end portion 154 of the tether 150 is connected to an upper portion 76 of the front panel 74 of the air bag 14. The tether 150 extends through a guide 156 that is connected to the air bag 14. The guide 156 anchors the tether 150 to the air bag and permits the tether 150 to slide or otherwise move through its structure. The guide 156 divides the tether 150 into a first segment that serves as a trigger tether 162 and a second segment that serves as a shaping tether 164.

The guide 156 may take various forms. Referring to FIG. 3, the guide 156 may, for example, comprise a loop of material, such as air bag material, that is secured to a panel of the air bag 14 by means such as stitching 158. Alternative means for connecting the guide 156 to the air bag 14 include ultrasonic welding, adhesives, and heat bonding, and mechanical fasteners. The guide 156 may have alternative constructions and/or configurations. For example, instead of a loop of material, the guide 156 may have a metal or plastic construction. Guides having this construction may, for instance, be in the form of a metal/plastic D-ring or a metal/plastic eyelet or grommet reinforcing a hole or aperture in a fabric material. As another example, the guide 156 may be configured as a part of the air bag housing 34, in which case the guide may comprise a ring or aperture formed in or connected to the housing structure.

The portion 80 of the front panel 74 to which the trigger tether 162 is connected has a large surface area and radius of curvature (see FIG. 1) compared to the surface area and radius of curvature of the portion 76 of the front panel (see FIG. 2) to which the shaping tether 164 is connected. The degree to which the surface area and radius of curvature of the upper portion 76 is smaller than that of the mid/lower portion 80 may be several fold. For the construction illustrated in FIGS. 1 and 2, the mid/lower portion 80 of the front panel 74 exerts a force on the trigger tether 162 that is greater than the force exerted on the shaping tether 164 by the upper portion 76 of the front panel.

When the air bag 14 inflates and deploys, the gas pressure in the bag acts normal to the surface of the panels defining the inflatable volume 54 of the bag. The gas pressure in the air bag 14, acting on the comparatively large surface area of the mid/lower portion 80, exerts a correspondingly large magnitude force on the trigger tether 162. Conversely, the gas pressure acting on the comparatively smaller surface area of the upper portion 76 exerts a correspondingly smaller, reduced magnitude force on the shaping tether 164. As a result, the force urged on the shaping tether 164 by the upper portion 76 is overcome by the tensioned trigger tether 162. Because of this, as shown in FIG. 1, the mid/lower portion 80 pulls the tether 150 through the guide 156, lengthening the trigger tether 162 and shortening the shaping tether 164.

As a result, the shaping tether 164 restricts deployment of the upper portion 76, thus drawing in the upper portion and giving the air bag 14 the shape illustrated in FIG. 1. The mid/lower portion 80 thus substantially achieves a fully deployed condition illustrated in FIG. 1. By "substantially achieves," it is meant to recognize that the mere presence of the tether 150 and guide 156 arrangement will result in some minimal restriction in deployment of the mid/lower portion 80, since it would be impossible for the arrangement to have absolutely no effect. The air bag 14, tether 150, and guide 156 are constructed and arranged with this in mind so that the restriction of the mid/lower portion is minimal, does not prevent the mid/lower portion from performing its intended function, and is therefore negligible.

Additionally, the upper portion 76, being drawn in as shown in FIG. 1, is substantially inhibited from reaching a fully deployed condition (see FIG. 2). By "substantially inhibited," it is meant that the upper portion 76 is drawn in to a degree such that there is a significant and appreciable alteration or adjustment in performance over that of the upper portion in the fully deployed condition. The upper portion 76 would thus exhibit some appreciable change or adjustment in performance or coverage as the tether 150 releases the upper portion to move toward its fully deployed condition, as described in greater detail in the following paragraphs.

According to the present invention, the adaptive tether 150 functions in cooperation with the guide 156 to be responsive to vehicle conditions, occupant conditions, or both vehicle conditions and occupant conditions to adapt the inflated condition of the air bag 14. Particularly, the tether 150 may adapt the inflation, deployment, configuration, shape, pressurization, or a combination thereof, of the air bag 14. According to the embodiment of FIGS. 1 and 2, this control is implemented passively through the physical construction and configuration of the air bag 14 and the adaptive tether 150 and guide 156.

In particular, in the embodiment of FIGS. 1 and 2, the air bag 14, adaptive tether 150, and guide 156 are constructed, configured, and arranged to adapt the inflated condition of the air bag 14 depending on whether the occupant 20 is restrained by the seatbelt 18 at the time that the air bag 14 is deployed. This is beneficial because an unbelted occupant will penetrate into the air bag 14 to a greater extent and at a different location on the bag than a belted occupant.

As shown in FIG. 1, in the case of a belted occupant 20, the seatbelt 18 serves to help restrain the occupant 20. As a result, the belted occupant 20, especially the occupant's lower torso 90 and hips 92 are restrained from moving toward the instrument panel 36. This allows the air bag 14 to inflate and deploy with comparatively little resistance or inhibition from the occupant 20. As shown in dashed lines at 20', the belted occupant's head 94 and upper torso 96 penetrate into a middle portion 100 of the air bag 14. The middle portion 100 is positioned below an upper portion 102 of the air bag in the area where the end portion 154 of the shaping tether 164 is connected to the front panel 74. The middle portion 100 is also positioned above a lower portion 104 of the air bag 14, in the area where the end portion 152 of the trigger tether 162 is connected to the front panel 74. As shown in FIG. 1, the degree or distance to which the occupant 20' penetrates into the air bag 14 may be comparatively or relatively small.

As shown in FIG. 2, in the case of an unbelted occupant 20, the seatbelt 18 does not help restrain the occupant 20. As a result, the unbelted occupant 20, including the occupant's lower torso 90 and hips 92, are not restrained from moving toward the instrument panel 36. Thus, as the air bag 14 inflates and deploys in response to the vehicle impact, the occupant's entire body moves unrestrained toward the instrument panel 36. As shown in dashed lines at 20', when this occurs, the unbelted occupant 20 may also move upward as the occupant moves toward the instrument panel 36. This can occur for several reasons. The seat bottom may be inclined upward from rear to front, so the occupant 20, moving forward on the seat bottom, also moves upward. Also, the occupant 20, in moving forward, may also move from a reclined position to an upright position. Further, the occupant 20 may move upward off the seat as he or she moves forward in the vehicle.

As shown in dashed lined in FIG. 2, the occupant's head 94 penetrates into the upper portion 102 of the air bag 14. The occupant's upper torso 96 penetrates into the middle portion 100 of the air bag 14. The occupant's lower torso 90 penetrates into the lower portion 104 of the air bag 14. As shown in FIG. 2, the degree or distance to which the occupant 20' penetrates into the air bag 14 may be comparatively or relatively large or substantial when viewed in comparison with the belted occupant (see FIG. 1).

Those skilled in the art will appreciate that the tether 150 of the embodiment of FIGS. 1 and 2, owing to its cooperation with the guide 156, tailors the inflated condition of the air bag 14 in response to the buckled status of the vehicle occupant 20. In the case of the buckled occupant 20, the tether 150 maintains the basic configuration illustrated in FIG. 1, restraining the upper portion 102 from deploying fully while permitting the lower portion 104 to deploy fully. As a result, the air bag 14 is initially deployed and maintained in configuration of FIG. 1, which is a low volume configuration in comparison with the configuration of FIG. 2. The low volume configuration of the air bag 14 in FIG. 1 requires a lesser volume of inflation fluid in order to achieve the desired inflation, deployment, and pressurization characteristics. This can help reduce the required size and cost of the inflator and also helps ensure reliability in inflation and deployment. Since the unbuckled occupant is the worst case scenario, the inflator is sized to provide a volume of inflation fluid sufficient to inflate, deploy, and pressurize the air bag 14 to the large volume inflated condition of FIG. 2 within the desired performance parameters. This being the case, the volume of inflation fluid delivered by the inflator is certainly sufficient to inflate, deploy, and pressurize the air bag 14 to the small volume inflated condition of FIG. 1 within the desired performance parameters. Since the buckled occupant is the expected condition, the tether configuration of FIGS. 1 and 2 helps bolster the reliability of the apparatus.

In the case of the unbuckled occupant 20, the air bag 14 initially inflates toward the configuration where the tether 150 maintains the basic configuration illustrated in FIG. 1. The unbelted occupant 20, however, being unrestrained by the seatbelt 18, moves into engagement with the lower portion 104, moves the lower portion toward the instrument panel 36, thus relieving the force exerted on the trigger tether 162 by the mid/lower portion 80 of the front panel 74. As a result, the tether 150 moves through the guide 156, thus shortening the trigger tether 162 and lengthening the shaping tether 164, thereby releasing the upper portion 102 of the air bag 14 to deploy fully to the condition illustrated in FIG. 2. The upper portion 102, when in this condition, is positioned to receive and cushion the unbelted occupant 20'. Those skilled in the art will appreciate that the degree to which the tether 150 releases the upper portion 102 of the air bag to deploy is proportional to the degree to which the occupant 20 penetrates the air bag 14.

Those skilled in the art will also appreciate that, advantageously, the tether 150 and guide 156 of the present invention adapt the configuration of the air bag 14 depending on whether the occupant 20 is restrained by the seatbelt 18. The tether 150 tailors the configuration of the air bag 14 so that the air bag has a comparatively small volume while covering the space where the buckled occupant 20 (FIG. 1) strikes the air bag. Also, the tether 150 tailors the configuration of the air bag 14 so that the air bag has a comparatively large volume while covering the space where the unbuckled occupant 20 (FIG. 2) strikes the air bag.

Furthermore, since deployment of the upper portion 102 is proportional to occupant 20 penetration into the air bag 14, the tether 150 tailors the configuration of the air bag 14 for conditions between the buckled and unbuckled extremes illustrated in FIGS. 1 and 2, respectively. For example, the occupant's position at the time of air bag deployment (e.g., leaned forward or otherwise away from a normally seated position) can affect the degree of occupant penetration and, thus, the resulting deployment of the upper portion of the air bag 14. Similarly, the vehicle seat forward/rearward position, varied vehicle speeds at the time of deployment, and varied occupant sizes between the small 5% female and the large 95% male all can affect the degree of occupant penetration and therefore proportionally effect deployment of the upper portion 102 of the air bag 14.

As shown and described in accordance with FIGS. 1-3, the tether 150 and guide 156 of the present invention are configured, advantageously, to translate movement of a first portion of the protection device in a first direction to movement of a second portion of the protection device in a second direction different from the first direction. Those skilled in the art, however, will appreciate that this translation of relative movements is not limited to movement of the panels of the air bag 14 shown in FIGS. 1-3. The tether 150 and guide 156 of the present invention are adaptable to provide a variety air bag adaptations, such as those described in the following paragraphs and illustrated in the accompanying figures.

Figure 5A:
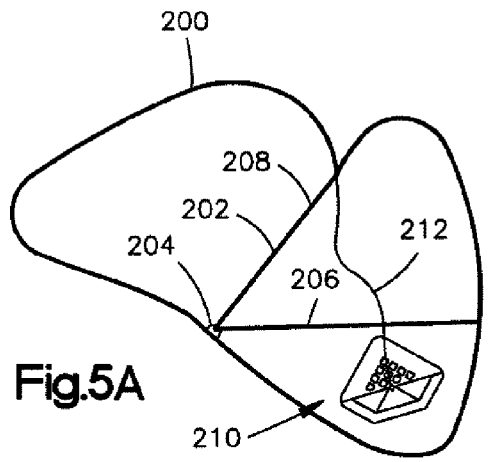
FIGS. 5A and 5B are schematic side views illustrating different conditions of an apparatus for helping to protect an occupant of a vehicle, according to a second embodiment of the invention.
Figure 5B:
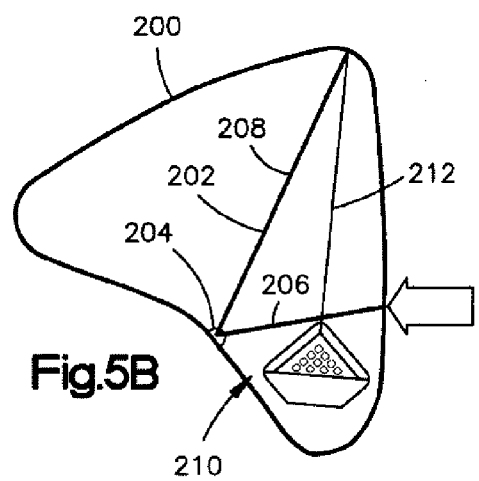

Referring to the embodiment of FIGS. 5A and 5B, an air bag 200 includes a tether 202 and a guide 204 arranged in a manner that is similar or identical to that illustrated in FIGS. 1 and 2. The guide 204 divides the tether 202 into a trigger tether 206 and a shaping tether 208. In the embodiment of FIGS. 5A and 5B, the air bag 200 also includes a vent 210 that is selectively actuatable to release inflation fluid from the inflatable volume of the air bag 200.

The vent 210 includes a vent tether 212 that is operative to actuate the vent 210 in response to vehicle and occupant conditions at the time the air bag is deployed. The vent tether 212 comprises a third segment of the tether 202 that extends from the location on the air bag 200 where the shaping tether 208 is attached to the bag. The vent tether 212 could, however, be a tether separate from the trigger and shaping tethers 206 and 208. The vent 210 has an open condition illustrated in FIG. 5A and is actuatable to a closed condition illustrated in FIG. 5B in response to tension on the trigger tether 212.

The vent 210 is configured to selectively release inflation fluid from the air bag 200 depending on vehicle and/or occupant conditions in the vehicle. If the air bag 200 inflates and deploys without obstruction as shown in FIG. 5A, the vent tether 212 remains slacked and the vent 210 remains in the open condition, thus venting inflation fluid from the air bag. If the air bag 200 inflates and deploys with an obstruction, illustrated generally by the arrow in FIG. 56, such as one resulting from an unbelted or forward positioned occupant, the air bag 200 deploys to the condition illustrated in FIG. 5B. In this condition, the vent tether 212 becomes tensioned and pulls the vent 210 to the closed condition blocking inflation fluid from venting from the air bag 200.

From the above, those skilled in the art will appreciate that, according to the present invention, the adaptive tether 202, guide 204, and vent 210, in combination, act to shape the air bag 200 and vent inflation fluid from the air bag in the event of unobstructed deployment (e.g., a belted occupant), and act to shape the air bag and block inflation fluid venting in the event of obstructed deployment (e.g., an un-belted occupant). The guide 204, in redirecting the tether 202 allows for simultaneously shaping the air bag 200 at a desired location on the bag while simultaneously allowing for the selective actuation of the vent. The portion of the air bag 200 that is adapted or shaped can be configured through the careful selection of the locations on the air bag 200 where the tether 202 and guide 204 are located. Advantageously, the adaptive shaping and venting achieved through the adaptive tether 202, guide 204, and vent 210 are controlled passively and respond without the need to actively monitor the occupant or vehicle and without the need to actively actuate the tether or vent.

As another advantage, by adjusting the relative lengths of the trigger tether 206, shaping tether 208, and vent tether 212 or by adjusting the relative positions at which the tethers and guide 204 are connected to the air bag 200, the air bag can be adapted to vent inflation fluid from the air bag when the bag is at a predetermined stage of deployment. For example, the relative lengths of the tethers 206, 208, and 212 and/or the relative positions at which the tethers are connected to the air bag 14c could be adapted such that the vent 210 blocks inflation fluid venting at any time before or up to the time that the air bag reaches the fully inflated and deployed condition of FIG. 5B. Therefore, tether 202 and guide 204 could be configured such that the 210 blocks inflation fluid venting when the air bag 200 reaches any degree of deployment between the condition of FIG. 5A and the condition of FIG. 5B.

Figure 6A:
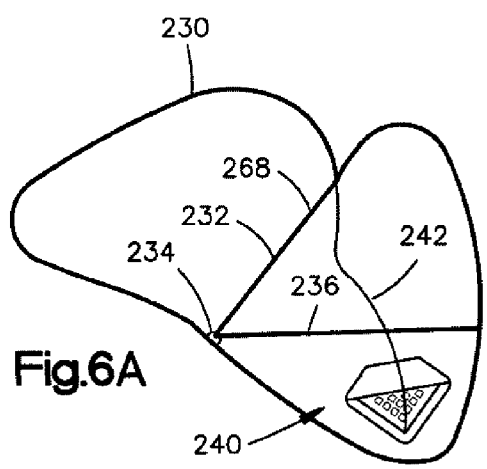
FIGS. 6A and 6B are schematic side views illustrating different conditions of an apparatus for helping to protect an occupant of a vehicle, according to a third embodiment of the invention.
Figure 6B:
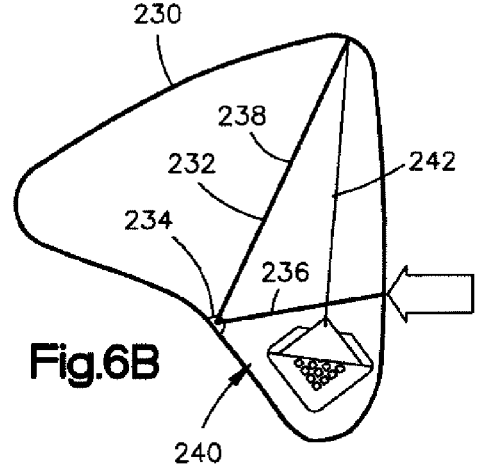

Referring to the embodiment of FIGS. 6A and 6B, an air bag 230 includes a tether 232 and a guide 234 arranged in a manner that is similar or identical to that illustrated in FIGS. 5A and 5B. The guide 234 divides the tether 232 into a trigger tether 236 and a shaping tether 238. In the embodiment of FIGS. 6A and 6B, the air bag 230 also includes a vent 240 that is selectively actuatable to release inflation fluid from the inflatable volume of the air bag 230.

The vent 240 includes a vent tether 242 that is operative to actuate the vent 240 in response to vehicle and occupant conditions at the time the air bag is deployed. The vent tether 242 comprises a third segment of the tether 232 that extends from the location on the air bag 230 where the shaping tether 238 is attached to the bag. The vent tether 242 could, however, be a tether separate from the trigger and shaping tethers 236 and 238. The vent 240 has a closed condition illustrated in FIG. 6A and is actuatable to an open condition illustrated in FIG. 6B in response to tension on the trigger tether 242.

The vent 240 is configured to selectively release inflation fluid from the air bag 230 depending on vehicle and/or occupant conditions in the vehicle. The only difference between the air bag 230 of FIGS. 5A and 5B and the air bag 230 of FIGS. 6A and 6B is that the vent 230 is actuatable from a closed condition (FIG. 6A) to the open condition (FIG. 6B). If the air bag 230 inflates and deploys without obstruction as shown in FIG. 6A, the vent tether 242 remains slacked and the vent 240 remains in the closed condition, thus blocking inflation fluid venting from the air bag. If the air bag 230 inflates and deploys with an obstruction, illustrated generally by the arrow in FIG. 6B, such as one resulting from an unbelted or forward positioned occupant, the air bag 230 deploys to the condition illustrated in FIG. 6B. In this condition, the vent tether 242 becomes tensioned and pulls the vent 240 to the open condition thus venting inflation fluid from the air bag 230.

From the above, those skilled in the art will appreciate that, according to the present invention, the adaptive tether 232, guide 234, and vent 240, in combination, act to shape the air bag 230 and vent inflation fluid from the air bag in the event of unobstructed deployment (e.g., a belted occupant), and act to shape the air bag and block inflation fluid venting in the event of obstructed deployment (e.g., an un-belted occupant). The guide 234, in redirecting the tether 232 allows for simultaneously shaping the air bag 230 at a desired location on the bag while simultaneously allowing for the selective actuation of the vent. The portion of the air bag 230 that is adapted or shaped can be configured through the careful selection of the locations on the air bag 230 where the tether 232 and guide 234 are located. Advantageously, the adaptive shaping and venting achieved through the adaptive tether 232, guide 234, and vent 240 are controlled passively and respond without the need to actively monitor the occupant or vehicle and without the need to actively actuate the tether or vent.

As another advantage, by adjusting the relative lengths of the trigger tether 236, shaping tether 238, and vent tether 242 or by adjusting the relative positions at which the tethers and guide 234 are connected to the air bag 230, the air bag can be adapted to vent inflation fluid from the air bag when the bag is at a predetermined stage of deployment. For example, the relative lengths of the tethers 236, 238, and 242 and/or the relative positions at which the tethers are connected to the air bag 14c could be adapted such that the vent 240 blocks inflation fluid venting at any time before or up to the time that the air bag reaches the fully inflated and deployed condition of FIG. 6B. Therefore, tether 232 and guide 234 could be configured such that the 240 blocks inflation fluid venting when the air bag 230 reaches any degree of inflation between the condition of FIG. 6A and the condition of FIG. 6B.

Figure 7A:
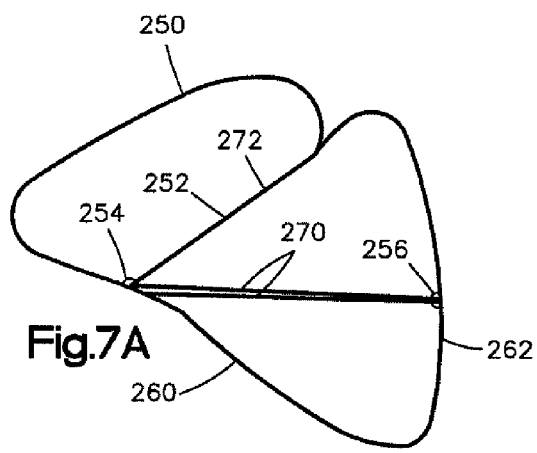
FIGS. 7A and 7B are schematic side views illustrating different conditions of an apparatus for helping to protect an occupant of a vehicle, according to a fourth embodiment of the invention.
Figure 7B:
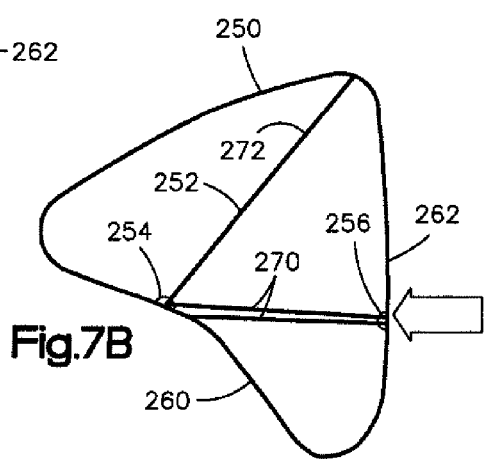

Another embodiment of the invention is illustrated in FIGS. 7A and 7B. Referring to FIGS. 7A and 7B, an air bag 250 includes a tether 252 and a first and second guides 254 and 256, respectively. The first guide 254 is secured to the air bag 250 on a rear panel 260 of the bag. The second guide 256 is secured to the air bag 250 on a front panel 262 of the bag. The guides 254 and 256 divide the tether 250 into three segments in a manner such that a trigger tether 270 comprises two of the segments, while a shaping tether 272 comprises the remaining segment.

The tether 252 is configured to selectively tailor the shape of the air bag 250 depending on vehicle and/or occupant conditions in the vehicle. If the air bag 250 inflates and deploys without obstruction as shown in FIG. 7A, the shaping tether 272 is tensioned via the trigger tether 270 and thereby shapes the air bag 250 in the manner shown. If the air bag 250 inflates and deploys with an obstruction, illustrated generally by the arrow in FIG. 7B, such as one resulting from an unbelted or forward positioned occupant, the air bag 250 deploys to the condition illustrated in FIG. 7B. In this condition, the trigger tether 270 does not tension the shaping tether 272 and the air bag 250 thereby reaches the fully deployed condition illustrated in FIG. 7B.

From the above, those skilled in the art will appreciate that, according to the present invention, the adaptive tether 252, guides 254 and 256, in combination, act to shape the air bag 250 in the event of unobstructed deployment (e.g., a belted occupant), and act to shape the air bag in the event of obstructed deployment (e.g., an un-belted occupant). The guides 254 and 256, in redirecting the tether 252 allow for shaping the air bag 250 at a desired location on the bag. The portion of the air bag 250 that is adapted or shaped can be configured through the careful selection of the locations on the air bag 250 where the tether 252 and guides 254 and 256 are located. Advantageously, the adaptive shaping and venting achieved through the adaptive tether 252 and guides 254 and 256 are controlled passively and respond without the need to actively monitor the occupant or vehicle.

In the embodiment of FIGS. 7A and 7B, the inclusion of the first and second guides 254 and 256 configures the tether 252 to tailor the shape of the air bag 250 in a manner different than the single guide configuration of the previous embodiments. The two-guide configuration effectively doubles the length of the shaping tether 272 that is taken up due to the front panel 262 moving in the deployment direction and tensioning the two-legged trigger tether 270. Similarly, the two-guide configuration effectively doubles the length of the shaping tether 270 that is released due to the front panel 262 being moved (e.g., by an unbelted occupant) in the direction indicated generally by the arrow in FIG. 7A. The two-guide configuration of FIGS. 7A and 7B can thus increase the extent to which the air bag 250 is shaped in the case of unobstructed deployment.

In the embodiment of FIGS. 7A and 7B, occupant penetration in the direction of the arrow in FIG. 7B a given distance would produce a resulting increase in the length of the shaping tether 272 that is twice that given distance. If the number of guides is decreased, for example by removing a guide and thereby producing the configuration of FIGS. 1 and 2, occupant penetration a given distance would produce a resulting increase in the length of the shaping tether 272 that is equal to the given distance. Similarly, if the number of guides is increased by providing guides in addition to those illustrated in FIGS. 7A and 7B, occupant penetration a given distance would produce a resulting increase in the length of the shaping tether 220 that is correspondingly increased over the twofold increase of the illustrated two-guide embodiment.

Figure 8A:
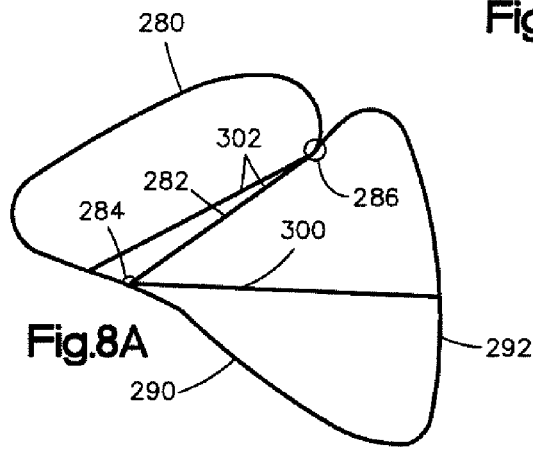
FIGS. 8A and 8B are schematic side views illustrating different conditions of an apparatus for helping to protect an occupant of a vehicle, according to a fifth embodiment of the invention.
Figure 8B:
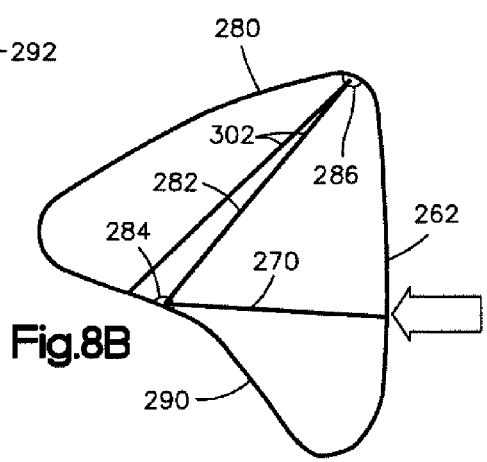

A further embodiment of the invention is illustrated in FIGS. 8A and 8B. Referring to FIGS. 8A and 8B, an air bag 280 includes a tether 282 and a first and second guides 284 and 286, respectively. The first guide 284 is secured to the air bag 280 on a rear panel 290 of the bag. The second guide 286 is secured to the air bag 280 on a front panel 292 of the bag. The guides 284 and 286 divide the tether 280 into three segments in a manner such that a trigger tether 300 comprises one of the segments, while a shaping tether 302 comprises the remaining two segments.

The tether 282 is configured to selectively tailor the shape of the air bag 280 depending on vehicle and/or occupant conditions in the vehicle. If the air bag 280 inflates and deploys without obstruction as shown in FIG. 8A, the shaping tether 302 is tensioned via the trigger tether 300 and thereby shapes the air bag 280 in the manner shown. If the air bag 280 inflates and deploys with an obstruction, illustrated generally by the arrow in FIG. 8B, such as one resulting from an unbelted or forward positioned occupant, the air bag 280 deploys to the condition illustrated in FIG. 8B. In this condition, the trigger tether 300 does not tension the shaping tether 302 and the air bag 280 thereby reaches the fully deployed condition illustrated in FIG. 8B.

From the above, those skilled in the art will appreciate that, according to the present invention, the adaptive tether 282 and guides 284 and 286, in combination, act to shape the air bag 280 in the event of unobstructed deployment (e.g., a belted occupant), and act to shape the air bag in the event of obstructed deployment (e.g., an un-belted occupant). The guides 284 and 286, in redirecting the tether 282 allow for shaping the air bag 280 at a desired location on the bag. The portion of the air bag 280 that is adapted or shaped can be configured through the careful selection of the locations on the air bag 280 where the tether 282 and guides 284 and 286 are located. Advantageously, the adaptive shaping and venting achieved through the adaptive tether 282 and guides 284 and 286 are controlled passively and respond without the need to actively monitor the occupant or vehicle.

In the embodiment of FIGS. 8A and 8B, the inclusion of the first and second guides 284 and 286 configures the tether 282 to tailor the shape of the air bag 280 in a manner different than the single guide and two-guide configurations of the previous embodiments. The two-guide configuration of FIGS. 8A and 8B effectively halves the length of the shaping tether 302 that is taken up due to the front panel 292 moving in the deployment direction and tensioning the trigger tether 300. Similarly, the two-guide configuration effectively halves the length of the shaping tether 300 that is released due to the front panel 292 being moved (e.g., by an unbelted occupant) in the direction indicated generally by the arrow in FIG. 8A. The two-guide configuration of FIGS. 8A and 8B thus reduces the extent to which the air bag 280 is shaped in the case of unobstructed deployment.

In the embodiment of FIGS. 8A and 8B, occupant penetration in the direction of the arrow in FIG. 8B a given distance would produce a resulting increase in the length of the shaping tether 302 that is half the given distance. If the number of guides is decreased, for example by removing a guide and thereby producing the configuration of FIGS. 1 and 2, occupant penetration a given distance would produce a resulting increase in the length of the shaping tether 302 that is equal to the given distance. Similarly, if the number of guides is increased by providing guides in addition to those illustrated in FIGS. 8A and 8B, occupant penetration a given distance would produce a resulting decrease in the length of the shaping tether 302 that is correspondingly decreased from the halved length of the illustrated two-guide embodiment.

The adaptive characteristics supplied to the air bag through the configuration of the adaptive tether and the associated guides described herein are not limited to the passenger frontal air bag of the illustrated embodiments. Those skilled in the art will appreciate that adaptive tether and guide configurations can be applied to other inflatable vehicle occupant protection devices, such as driver frontal air bags, driver or passenger side impact air bags and side curtain air bags, and inflatable knee bolsters, in order to achieve desired adaptive characteristics in those devices.

For a driver frontal air bag, the desired adaptive characteristics of the air bag may be similar or identical to those described herein with regard to the passenger frontal air bags of the illustrated embodiments. It thus follows that the considerations that affect the selected configuration of the adaptive tether and the associated guide(s) and/or vents in order to produce those desired adaptive characteristics may also be similar or identical to those described herein with regard to the passenger frontal air bags of the illustrated embodiments. Thus, for example, factors such as the occupants position, the position of the vehicle seat, whether the occupant is in the normally seated position at the time of air bag deployment, or a combination of these factors may affect the adaptive characteristics of the air bag and the considerations that affect the selected configuration of the air bag.

For driver/passenger side impact air bags and side curtain air bags, factors such as occupant width or girth, whether the occupant is leaned against the vehicle side structure, whether the occupant is positioned away from the normally seated position, or a combination of these factors can affect the desired adaptive characteristics for the air bag. Thus, the considerations that affect the selected configuration of the air bag, particularly the configuration of the adaptive tether and the associated guide(s) and/or vents, may vary according to the factors particular to the side impact/side curtain implementation.

For an inflatable knee bolster, factors such as the occupant's leg length, leg position, the position of the vehicle seat, or a combination of these factors can affect the desired adaptive characteristics for the knee bolster. Thus, the considerations that affect the selected configuration of the knee bolster, particularly the configuration of the adaptive tether and the associated guide(s) and/or vents, may vary according to the factors particular to the knee bolster implementation.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to control deployment of an inflatable protection device, the apparatus comprising:
   a tether having a first connection with a first portion of the protection device and a second connection with a second portion of the protection device, each of the first and second portions being configured to receive occupant penetration; and
   a guide connected to the protection device, the tether extending through the guide;

the tether configured to move through the guide in response to occupant penetration into the first portion of the protection device to move the second portion of the protection device in a direction that alters how the second portion of the protection device is configured to receive occupant penetration.

2. The apparatus recited in claim 1, wherein the tether is configured to move through the guide and translate movement of the first portion to movement of the second portion in response to occupant penetration into the first portion.

3. The apparatus recited in claim 1, wherein the tether and guide are constructed and arranged such that the first portion of the protection device substantially achieves a fully deployed condition when free from obstruction during deployment, the first portion of the protection device in substantially achieving its fully deployed condition pulling the tether through the guide which causes the tether to draw-in the second portion of the protection device, thus substantially inhibiting the second portion from reaching a fully deployed condition.

4. The apparatus recited in claim 1, wherein the tether and guide are constructed and arranged such that the first portion reaches its fully deployed condition when the protection device deploys without being obstructed.

5. The apparatus recited in claim 1, wherein the tether and guide are constructed and arranged to permit the second portion of the protection device to deploy toward a fully deployed condition to an extent that is in proportion to the extent to which deployment of the first portion of the protection device toward a fully deployed condition is inhibited.

6. The apparatus recited in claim 5, wherein the proportion of second portion deployment to first portion obstruction is 1:1.

7. The apparatus recited in claim 5, wherein the proportion of second portion deployment to first portion obstruction is 2:1 or greater.

8. The apparatus recited in claim 5, wherein the proportion of second portion deployment to first portion obstruction is 1:2 or less.

9. The apparatus recited in claim 1, wherein the first portion comprises a panel of the protection device, the apparatus further comprising an actuatable vent, the tether and guide being constructed and arranged to actuate the vent in response to deployment of the panel.

10. The apparatus recited in claim 9, wherein the tether and guide are constructed and arranged to actuate the vent to a closed condition in response to deployment of the panel.

11. The apparatus recited in claim 9, wherein the tether and guide are constructed and arranged to actuate the vent to an open condition in response to deployment of the panel.

12. The apparatus recited in claim 1, wherein the guide comprises a loop of material.

13. The apparatus recited in claim 1, further comprising a vent for venting inflation fluid from the protection device, the vent being actuatable in response to deployment of the first portion being blocked from reaching a fully deployed condition.

14. The apparatus recited in claim 1, further comprising a vent for venting inflation fluid from the protection device, the vent being actuatable in response to the second portion reaching a fully deployed condition.

15. The apparatus recited in claim 1, wherein:
the guide comprises a first guide connected to the first portion of the protection device and a second guide connected to the protection device at a location spaced from both the first and second portions of the protection device;
the tether comprises a first terminal end portion anchored to the protection device at a location adjacent or near the second guide and an opposite second terminal end portion anchored to the second portion of the protection device;
the tether comprising a first segment that acts as a trigger tether and a second segment that acts as a shaping tether, the trigger tether extending from the first terminal end portion through the first guide and to the second guide, the shaping tether extending from the second guide to the second terminal end of the tether.

16. The apparatus recited in claim 15, wherein the guide connected to the first portion of the protection device defines the first connection of the tether to the protection device.

17. The apparatus recited in claim 1, wherein:
the guide comprises a first guide connected to the protection device at a location spaced from both the first and second portions of the protection device and a second guide connected to the second portion of the protection device;
the tether comprises a first terminal end portion anchored to the first portion of the protection device an opposite second terminal end portion anchored to the protection device at a location adjacent or near the second guide;
the tether comprising a first segment that acts as a trigger tether and a second segment that acts as a shaping tether, the trigger tether extending from the first terminal end portion to the first guide, the shaping tether extending from the first guide through the second guide and to the second terminal end of the tether.

18. The apparatus recited in claim 17, wherein the second guide defines the second connection of the tether to the protection device.

19. The apparatus recited in claim 1, wherein the guide comprises a plurality of guides and the tether extends through each of the plurality of guides, the tether being configured and arranged to extend through the plurality of guides so that the movement of the first portion in the first direction is translated to movement of the second portion in the second direction at a ratio other than 1:1.

20. The apparatus recited in claim 1, wherein a portion of the tether extending from the first connection comprises a trigger tether configured to shorten in response to occupant penetration into the first portion, a portion of the tether extending from the second connection to the trigger tether comprising a shaping tether configured to lengthen in response to shortening of the trigger tether, the second portion of the protection device being configured to move toward a fully deployed condition in response to lengthening of the shaping tether.

21. The apparatus recited in claim 20, wherein the guide defines a transition point where the trigger tether transitions to the shaping tether.

22. The apparatus recited in claim 20, wherein the guide comprises a plurality of guides, at least one of the shaping and trigger tethers extending through a plurality of the guides so that the movement of the first portion in the first direction is translated to movement of the second portion in the second direction at a ratio other than 1:1.

23. The apparatus recited in claim 1, wherein the first direction of movement of the first portion is in a direction away from a first vehicle occupant position and the second direction of movement of the second portion is in a direction towards a second vehicle occupant position.

* * * * *